(12) United States Patent
Moscovitch

(10) Patent No.: US 8,922,457 B2
(45) Date of Patent: *Dec. 30, 2014

(54) CONTROLLER AND GRAPHICS ASSEMBLIES IN MULTI-SCREEN DISPLAY SYSTEMS

(76) Inventor: Jerry Moscovitch, Toronto (CA)

( * ) Notice: Subject to any disclaimer, the term of this patent is extended or adjusted under 35 U.S.C. 154(b) by 1598 days.

This patent is subject to a terminal disclaimer.

(21) Appl. No.: 12/092,803

(22) PCT Filed: Nov. 6, 2006

(86) PCT No.: PCT/CA2006/001809
§ 371 (c)(1),
(2), (4) Date: May 6, 2008

(87) PCT Pub. No.: WO2007/051308
PCT Pub. Date: May 10, 2007

(65) Prior Publication Data
US 2008/0284676 A1 Nov. 20, 2008

Related U.S. Application Data

(60) Provisional application No. 60/597,045, filed on Nov. 7, 2005.

(51) Int. Cl.
| G09G 5/00 | (2006.01) |
| G06F 1/16 | (2006.01) |
| G06F 1/18 | (2006.01) |
| G06F 3/14 | (2006.01) |

(52) U.S. Cl.
CPC ...... *G06F 1/1601* (2013.01); *G06F 2200/1612* (2013.01); *G06F 3/1431* (2013.01); *G06F 1/181* (2013.01)
USPC ................... 345/1.1; 361/679.21; 361/679.22

(58) Field of Classification Search
USPC ....................... 361/679.21–679.22, 681, 683; 345/1.1–3.4
See application file for complete search history.

(56) References Cited

U.S. PATENT DOCUMENTS

| 5,488,385 A | 1/1996 | Singhal |
| 5,680,820 A | 10/1997 | Randolph |
| 5,687,939 A * | 11/1997 | Moscovitch ............ 361/681 |
| 5,904,328 A * | 5/1999 | Leveridge et al. ......... 248/124.1 |

(Continued)

FOREIGN PATENT DOCUMENTS

| CA | 2335530 | 12/1999 |
| CA | 2376206 | 12/2000 |

(Continued)

OTHER PUBLICATIONS

Written Opinion of the ISA; PCT/CA2006/001809; Jan. 16, 2007 (date of completion of the Opinion).

(Continued)

*Primary Examiner* — Michael Pervan

(57) ABSTRACT

A multi-monitor display system is described having an arm adapted for supporting a plurality of monitors containing display screens. The system also includes a column for supporting the arm, a monitor controller assembly for electronically controlling images displayed on the screens, and a graphics assembly for sending signals to the monitor controller assembly to produce the images. The system is used in conjunction with a central processor located in a computer housing. The monitor controller assembly is disposed outside of the monitors and/or the graphics assembly is disposed outside the computer housing.

5 Claims, 5 Drawing Sheets

(56) References Cited

U.S. PATENT DOCUMENTS

| | | | |
|---|---|---|---|
| 5,948,092 A * | 9/1999 | Crump et al. ............... 710/300 |
| 6,043,797 A | 3/2000 | Clifton | |
| 6,151,401 A | 11/2000 | Annaratone | |
| 6,188,569 B1 | 2/2001 | Minemoto | |
| 6,222,507 B1 | 4/2001 | Gouko | |
| 6,229,584 B1 | 5/2001 | Chuo et al. | |
| 6,237,507 B1 | 5/2001 | Yanagisawa et al. | |
| 6,275,375 B1 | 8/2001 | Nam | |
| D448,023 S | 9/2001 | Kim | |
| D448,370 S | 9/2001 | Kim | |
| 6,333,750 B1 | 12/2001 | Odryna et al. | |
| 6,341,061 B1 | 1/2002 | Eisbach et al. | |
| 6,366,452 B1 | 4/2002 | Wang et al. | |
| 6,366,453 B1 | 4/2002 | Wang et al. | |
| 6,392,873 B1 | 5/2002 | Honda | |
| 6,430,038 B1 | 8/2002 | Helot et al. | |
| 6,532,146 B1 | 3/2003 | Duquette | |
| 6,587,082 B1 | 7/2003 | Moore | |
| 6,593,859 B1 | 7/2003 | Watanabe | |
| 6,643,124 B1 | 11/2003 | Wilk | |
| 6,690,337 B1 * | 2/2004 | Mayer et al. ............... 345/1.1 |
| 6,757,551 B2 | 6/2004 | Newman | |
| 6,870,518 B1 | 3/2005 | Brenner | |
| 7,014,154 B2 | 3/2006 | Jeong et al. | |
| 7,058,891 B2 | 6/2006 | O'Neal | |
| 7,061,472 B1 | 6/2006 | Schweizer et al. | |
| 7,061,754 B2 | 6/2006 | Moscovitch | |
| 7,126,588 B2 | 10/2006 | Oakley | |
| 7,126,815 B2 | 10/2006 | Hwang et al. | |
| 7,140,034 B2 | 11/2006 | Kamei et al. | |
| 7,145,767 B2 | 12/2006 | Mache et al. | |
| 7,267,312 B2 | 9/2007 | Kang et al. | |
| 7,331,551 B2 | 2/2008 | Oddsen, Jr. | |
| 7,652,876 B2 | 1/2010 | Moscovitch | |
| 7,796,772 B2 | 9/2010 | Takahashi et al. | |
| 2001/0011965 A1 | 8/2001 | Wilks | |
| 2002/0006031 A1 | 1/2002 | Liu | |
| 2002/0199047 A1 * | 12/2002 | DuPont et al. ............... 710/100 |
| 2003/0021086 A1 | 1/2003 | Landry et al. | |
| 2003/0086240 A1 * | 5/2003 | Jobs et al. ............... 361/683 |
| 2003/0231460 A1 | 12/2003 | Moscovitch | |
| 2004/0080482 A1 | 4/2004 | Magendanz et al. | |
| 2004/0150581 A1 | 8/2004 | Westerinen et al. | |
| 2005/0190191 A1 | 9/2005 | Turner | |
| 2006/0055626 A1 | 3/2006 | Tremblay | |
| 2006/0152898 A1 | 7/2006 | Hirayama | |
| 2007/0076006 A1 | 4/2007 | Knepper et al. | |
| 2007/0157856 A1 | 7/2007 | Skoog et al. | |
| 2008/0055189 A1 | 3/2008 | Wilk | |
| 2008/0284676 A1 | 11/2008 | Moscovitch | |
| 2009/0079665 A1 | 3/2009 | Moscovitch | |
| 2011/0075345 A1 | 3/2011 | Moscovitch | |
| 2013/0314300 A1 | 11/2013 | Moscovitch | |

FOREIGN PATENT DOCUMENTS

| | | | | |
|---|---|---|---|---|
| CA | 2446539 | | 12/2002 | |
| CA | 2437058 | | 2/2004 | |
| EP | 1102456 | A3 | 2/2001 | |
| EP | 1148409 | A2 * | 10/2001 | ............... G06F 1/16 |
| WO | WO 9939328 | A1 * | 8/1999 | ............... G09G 5/00 |
| WO | WO/00/39493 | | 7/2000 | |
| WO | WO 00/50979 | | 8/2000 | |
| WO | WO 0135197 | A1 * | 5/2001 | |
| WO | WO/2007/104157 | | 9/2007 | |
| WO | WO/2008/022439 | A1 | 2/2008 | |

OTHER PUBLICATIONS

International. Search Report; PCT/CA2006/001809; Jan. 15, 2007 (date of the actual completion of the international-type search).

Matrox Triple-Head2Go Product Sheets: http://www.matrox.com/graphics/en/gxm/products/th2go/home.php; downloaded Dec. 7, 2007.

International Search Report; PCT/CA2006/000413; Jerry Moscovitch (inventor); mailing date Jun. 21, 2007.

International Preliminary Report on Patentability; PCT/CA2006/000413; Jerry Moscovitch (inventor); date of completion: May 28, 2007.

Written Opinion of ISA; PCT/CA2006/000413; Jerry Moscovitch (inventor); mailing date: Jun. 21, 2007.

International Search Report; PCT/CA2007/001439; Raymond Wilk and Allan Tameshtit (inventors); mailing date Dec. 11, 2007.

Written Opinion of ISA; PCT/CA2007/001439; Raymond Wilk and Allan Tameshtit (inventors); mailing date Dec. 11, 2007.

Datasheets for DisplayLink Corp.; "Single Chip Device for USB Connected Display Applications"; Dated 2007; www.displaylink.com/pdf/DisplayLink%20DL-120%20and%20DL-160. pdf.

Whitepaper for DisplayLink Corp. "Monitors Made Easy with USB"; Dated 2007; http://www.displaylink.com/pdf/Multi-Monitor%20Made%20Easy%20with%20US.

Sunix. Corp. USB2.0 Graphic Adapter, Model No. VGA2614; Ver1.0 Aug. 2007.

Matrox DualHead2Go Product Sheets; http://www.matrox.com/graphics/en/gxm/products/dh2go/home.php (downloaded Dec. 4, 2007).

Matrox Press Release: Dated Nov. 8, 2005: http://www.matrox.com/graphics/en/corpo/news/dh2go/press_release.php.

Canadian Office Action (dated: Jan. 3, 2012); Appln. No. 2,634,827; Jerry Moscovitch (inventor).

U.S. Appl. No. 13/958,229, Nov. 28, 2013, Moscovitch, pending claims.

* cited by examiner

US 8,922,457 B2

CONTROLLER AND GRAPHICS ASSEMBLIES IN MULTI-SCREEN DISPLAY SYSTEMS

FIELD OF THE INVENTION

The present invention generally pertains to computer systems, and more particularly to graphics and monitor controller assemblies in multi-screen display systems.

BACKGROUND OF THE INVENTION

The number of multi-monitor or multi-screen computer display systems has increased in recent years as computer users in various industries adapt their use to new environments. For example, a multi-monitor display system can be used to create the illusion of a larger screen, thereby allowing a securities trader to view a large single spreadsheet over several displays. Alternately, the trader may view individual applications on individual screens (for example, one screen may display a Web Browser, a second a new service and a third a spreadsheet of financial data).

Individuals working with still or moving images, such as graphics artists, video or film editors or medical diagnosticians may also use multi-monitor display systems. A given image may be viewed across several screens or two images may be viewed side-by-side (such as two x-ray images used to assess the extent to which a broken bone has healed). Although the potential uses for multi-display systems appear to be limited only by the user's imagination, there may be barriers to their widespread use.

One barrier concerns the large size and weight of multi-monitor display systems. With the number of monitors per display system reaching four, six or even greater, the weight and size of the display system can become unwieldy.

Another barrier arises when a user of a single-monitor computer system wishes to upgrade to a multi-monitor system. In addition to acquiring the additional monitors for the upgrade, the user typically also has to replace the single-monitor graphics card in the computer system with a multi-monitor graphics card, or install at least one more single-monitor graphics card. Such a replacement is time consuming and can be costly if the user enlists the help of a technician to replace or add the graphics card.

Therefore, any innovation that can reduce the weight and/or size of multi-monitor computer systems, and that can obviate the need to replace or add a graphics card in the computer to achieve multi-monitor functionality is desirable.

SUMMARY OF THE INVENTION

An improved multi-monitor display system is described herein. In accordance with one aspect of the present invention, a multi-monitor or display system is provided for use with a central processor disposed within a computer housing. The multi-monitor display system includes an arm adapted for supporting a plurality of monitors having display screens, and a column for supporting the arm. The system further includes a monitor controller assembly for electronically controlling images displayed on the screens, and a graphics assembly for sending signals to the monitor controller assembly to produce the images. The monitor controller assembly is disposed outside of the monitors. Instead, or in addition, the graphics assembly is disposed outside of the computer housing. Advantageously, by not disposing the monitor controller assembly in the monitors, the resultant weight and size of the monitors may be reduced. Also, by not disposing the graphics assembly in the computer housing, the need to replace or add to the graphics card therein when upgrading from a single-monitor to a multi-monitor system is obviated.

BRIEF DESCRIPTION OF THE DRAWINGS

The present invention will become more fully understood from the detailed description and the accompanying drawings, wherein.

DETAILED DESCRIPTION OF THE PREFERRED EMBODIMENTS

Figure 1:
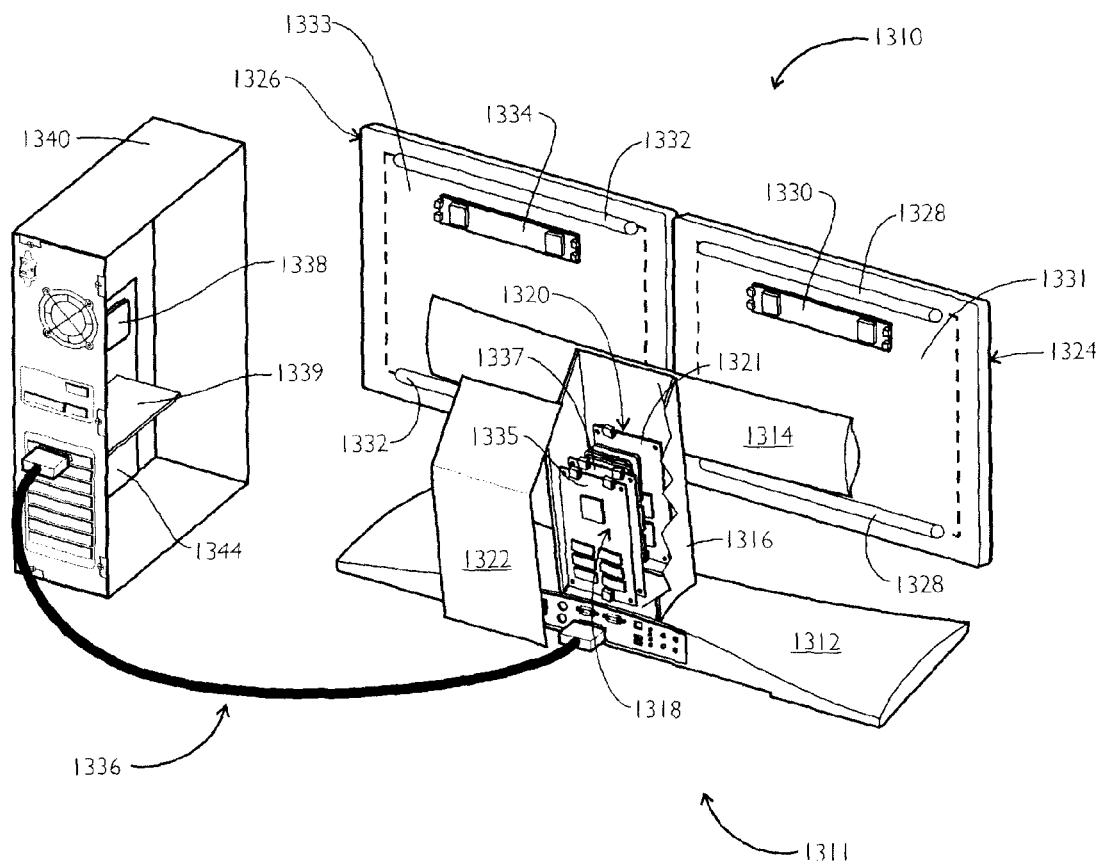
FIG. 1 is a rear view of a multi-monitor display system.

FIG. 1 shows a rear view of a multi-monitor display system 1310. The system 1310 includes a support structure 1311 having a base 1312, an arm 1314, and a column 1316 that connects the base 1312 to the arm 1314. The system 1310 also includes a monitor controller assembly 1318, and a graphics assembly 1320, which are both disposed in the column 1316. The graphics assembly 1320 can include a graphics card 1321. A removable cover 1322 on the column 1316 provides access to the monitor controller assembly 1318 and the graphics assembly 1320.

The arm 1314 is adapted for supporting at least two computer monitors 1324 and 1326, such as liquid crystal display (LCD) monitors. The first computer monitor 1324 includes a first light source 1328, such as a backlight, and a first inverter 1330 to provide power thereto. The first computer monitor 1324 has a first computer screen 1331 for displaying images. Likewise, the second computer monitor 1326 includes a second light source 1332, such as a backlight, and a second inverter 1334 to provide power thereto. The second computer monitor 1326 includes a second computer screen 1333 for displaying images.

A central processor 1338 resides on a motherboard 1341 housed within a computer housing 1340, such as a computer tower. The computer housing 1340 houses at least one central processor 1338 for running various applications, such as email applications and word processing applications. The central processor can be part of a personal computer, or a laptop or notebook computer, for example. In the latter case, instead of a computer tower, a notebook housing would house the central processor.

A processor connector assembly 1336 includes a bus extender 1339. The processor connector assembly 1336 allows the central processor 1338 to electronically communicate with the graphics assembly 1320.

The monitor controller assembly 1318 can include two controller cards 1335 and 1337, one for each of the monitors 1324 and 1326. An example of a commercially available controller card is model SP-1600 from Digital View™ of Morgan Hill, Calif. The monitor controller assembly 1318 transmits timing signals, in the form of low voltage differential signaling (LVDS) for example, to electronically control the images displayed on the first computer screen 1331 of the first monitor 1324 and the second screen 1333 of the second monitor 1326. The monitor controller assembly 1318 also sends power to the screens 1331 and 1333. In addition, the monitor controller assembly 1318 supplies power and/or control signals to the backlight inverters 1330 and 1334. It should be understood that electrical cables (not shown) running from the monitor controller assembly 1318 to the monitors 1324 and 1326 are used for this purpose. For example, the cables can run up the column 1316, along the arm 1314, and into the monitors 1324 and 1326 through appropriate apertures in the arm 1314 and monitors 1324 and 1326. The removable cover 1322 can be removed to provide access to the monitor controller assembly 1318 for modification, repair or replacement.

The graphics assembly 1320, which can contain one or more graphics cards 1321, sends signals to the monitor controller assembly 1318 to produce the images via an appropriate electrical connector (not shown). The graphics card 1321 can be a two-port graphics card, one port for each of the two computer monitors 1324 and 1326. Alternatively, two single-port graphics cards can be employed, as known to those of ordinary skill in the art. The graphics assembly 1320 is adapted for sending at least one of analog RGBhv/VGA signals and digital DVI signals to the monitor controller assembly 1318 to produce the images. Other appropriate types of signals can also be used for communication between the graphics assembly and the monitor controllers, as known to those of ordinary skill.

The arm 1314 of FIG. 1 is substantially horizontal and the column 1316 is substantially vertical. Other embodiments may have different geometries. For example, the multi-monitor display system can have two monitors supported by a vertical arm.

By disposing the monitor controller assembly 1318 in the column 1316, instead of disposing the monitor controller assembly within the monitors 1324 and 1326, the monitors 1324 and 1326 may be made slimmer. In addition, by disposing the graphics assembly 1320 in the column 1316, access to the graphics assembly 1320 is facilitated. In particular, unlike a typical multi-monitor display system having a graphics assembly in a computer tower, in the multi-monitor display system 1310 shown in FIG. 1, there is no need to disassemble the computer tower 1340 to gain access to the graphics assembly 1320.

An additional advantage of moving the graphics assembly outside of the computer tower is the simplification of the steps required of a user who wishes to upgrade from a single-monitor system to a multi-monitor system. In addition to acquiring the additional monitors for the upgrade, a user typically has to replace the single-monitor graphics assembly in the computer tower with a multi-monitor graphics assembly. Such a replacement is time consuming and can be costly if the user enlists the help of a technician to replace the graphics assembly. By placing the graphics assembly in the column, base, or arm, the need to replace the graphics assembly in the computer tower is obviated. In particular, a user of a single monitor system wishing to upgrade to a multi-monitor system typically buys a package that includes the monitors, and the support structure, comprising the base, column and arm, required to support the monitors. If the graphics assembly is included in the support structure, the user does not have to replace the graphics card in the computer tower. Instead, by issuing software controls, the user can disable the old single-monitor graphics assembly in the computer tower and enable the multi-monitor graphics assembly located in the purchased support structure. If a bus extender port external to the housing 1340 is available to connect the central processor to the graphics assembly in the support structure, then an upgrade from a single to a multi-monitor display configuration can be achieved without having to open the computer housing 1340.

In the embodiment shown in FIG. 1, the monitor controller assembly 1318 and the graphics assembly 1320 are disposed in the column 1316. Alternatively, the monitor controller assembly 1318 may be disposed in the base 1312 or the arm 1314, as described below in more detail. The graphics assembly 1320 may be disposed in the computer housing 1340 in a slot, such as a PCI slot.

Figure 2:
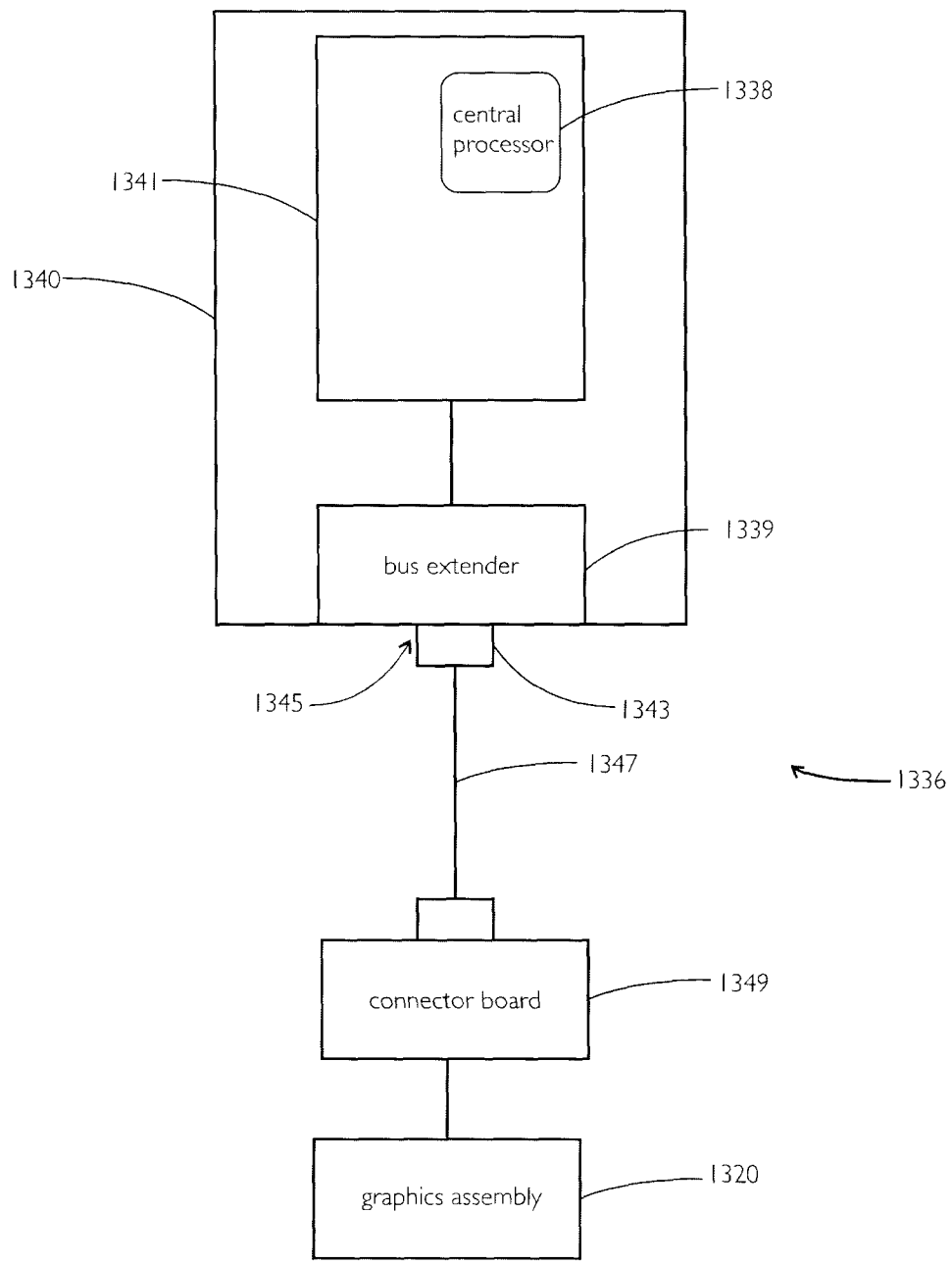
FIG. 2 is a block diagram showing more detail of an electrical connector assembly of FIG. 1.

FIG. 2 is a block diagram showing more detail of the processor connector assembly 1336 of FIG. 1. The processor connector assembly 1336 includes the bus extender 1339 that is connected to the motherboard 1341 containing the central processor 1338 located in the computer housing 1340. The bus extender 1341 includes a bus extender port 1343 that is accessible via an opening 1345 in the computer housing 1340. The processor connector assembly 1336 further includes a bus extender cable 1347 and a connector board 1349. The bus extender cable 1347 is connected to the extender port 1343 at one end, and at an opposite end to the connector board 1349. The connector board 1349 is an adapter that allows the bus extender cable 1347 to connect to the graphics assembly 1320. In one embodiment, the connector board 1349 contains just passive elements. In another embodiment, the connector board 1349 may also contain active elements, such as buffering elements. The bus extender cable 1347 transports digital signals, such as PCI signals, from the bus extender port 1343 to the connector board 1349.

Figure 3:
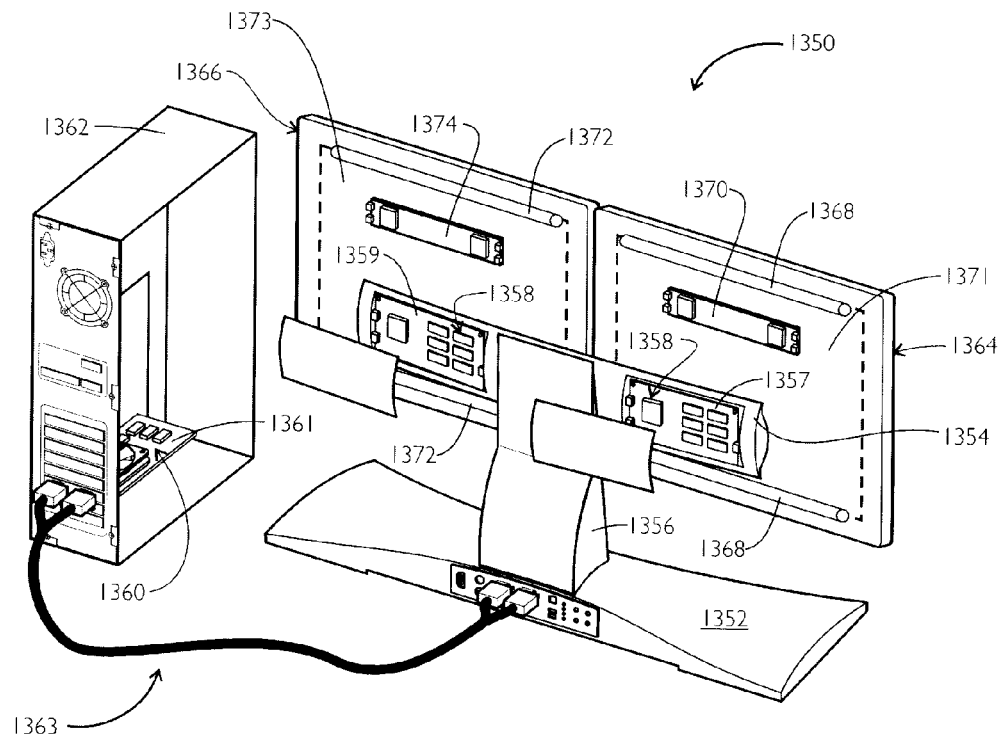
FIG. 3 is a rear view of another embodiment of a multi-monitor display system.

FIG. 3 shows a rear view of another embodiment of a multi-monitor display system 1350. The system 1350 includes a base 1352 and an arm 1354. A column 1356 connects the base 1352 to the arm 1354. The system 1350 also includes a monitor controller assembly 1358, which includes two monitor controller cards 1357 and 1359. The monitor controller assembly 1358 is disposed in the arm 1354. The system 1350 also includes a graphics assembly 1360, which includes a two-port graphics card 1361, disposed in a computer housing 1362, such as a computer tower.

The arm 1354 is adapted for supporting at least two computer monitors 1364 and 1366, such as liquid crystal display (LCD) monitors. The first computer monitor 1364 includes a first light source 1368, such as a backlight, and a first inverter 1370 to provide power thereto. The first computer monitor 1364 has a first computer screen 1371 for displaying images. Likewise, the second computer monitor 1366 includes a second light source 1372, such as a backlight, and a second inverter 1374 to provide power thereto. The second computer monitor 1366 includes a second computer screen 1373 for displaying images.

The monitor controller assembly 1358 includes the first monitor controller card 1357 associated with the monitor 1364, and the second monitor controller card 1359 associated with the monitor 1366. More generally, if the multi-monitor display system 1350 were to have N monitors, then the system 1350 would have N monitor controller cards, one for each monitor.

The first monitor controller card 1357 is disposed in the arm 1354 behind the monitor 1364 associated therewith. Likewise, the second monitor controller card 1359 is disposed in the arm 1354 behind the monitor 1366 associated therewith.

The monitor controller assembly 1358 transmits control signals, in the form of low voltage differential signaling (LVDS) for example, to electronically control the images displayed on the first screen 1371 of the first monitor 1364 and the second screen 1373 of the second monitor 1366, as described above. In addition, the monitor controller assembly 1358 supplies power and/or control signals to the inverters 1370 and 1374. Two removable covers 1380 and 1381 on the arm 1354 can be removed to provide access to the monitor controller cards 1357 and 1359, respectively, for modification, repair or replacement.

The graphics assembly 1360 is in electronic communication with the monitor controller assembly 1358 via electrical connectors 1363. The graphics assembly 1360 sends signals to the monitor controller assembly 1358 to produce images. The graphics assembly 1360 is adapted for sending at least one of analog RGBhv/VGA signals and digital DVI signals, or any other appropriate video signals, to the monitor controller assembly 1358 to produce the images.

The monitor controller assembly 1358 is in electrical communication with the screens 1371 and 1373 via appropriate electrical connectors (not shown) that are capable of carrying low voltage differential signaling (LVDS). The electrical connectors can include cables that run from the monitor controller assembly 1358 in the arm 1354 to electrical components in the monitors 1364 and 1366 that help produce images on the screens 1371 and 1373. Instead of LVDS, other types of appropriate signaling may also be used, as known to those of ordinary skill in the art.

It should be understood that in a different embodiment, the monitor controller assembly might also be disposed in the base 1352, instead of the arm 1354. Similarly, instead of the computer tower 1362, the graphics assembly may be disposed in any one of the base, the arm and the column.

Figure 4:
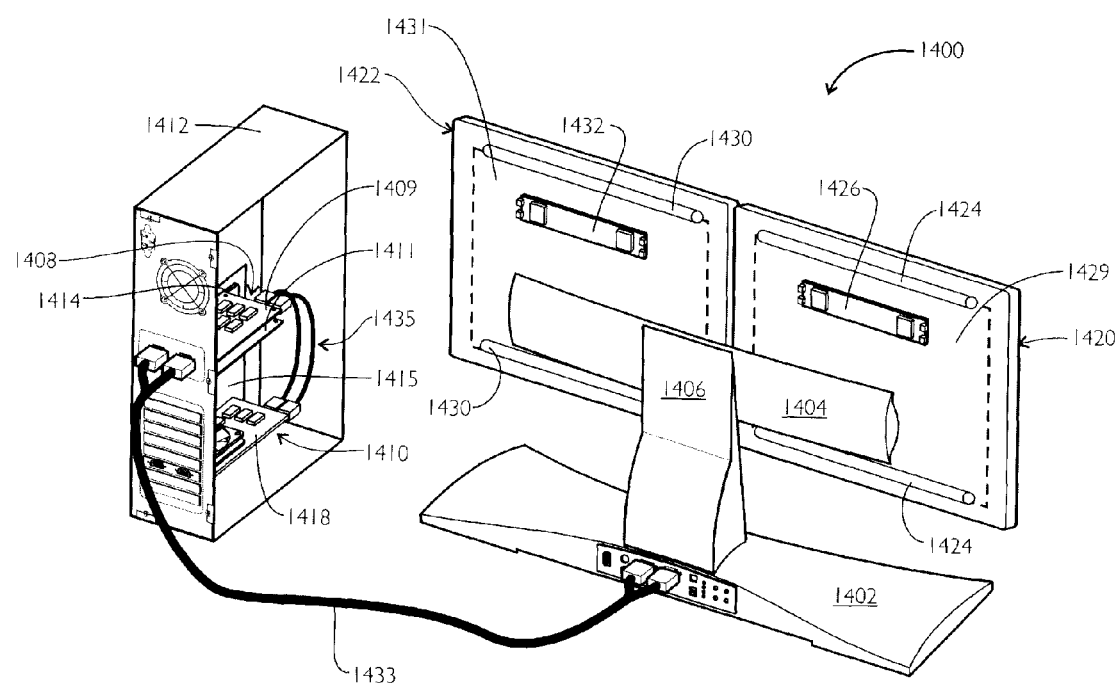
FIG. 4 is a rear view of another embodiment of a multi-monitor display system.

FIG. 4 shows another embodiment of a multi-monitor display system 1400. The system 1400 includes a base 1402 and an arm 1404. A column 1406 connects the base 1402 to the arm 1404. The system 1400 also includes a monitor controller assembly 1408, which includes two controller cards 1409 and 1411, and a graphics assembly 1410, which includes a two-port graphics card 1418. Instead, two single-port graphics cards could be used. The monitor controller assembly 1408 and the graphics assembly are both disposed in a computer housing 1412. Also disposed in the computer housing 1412 is at least one central processor 1414 residing on a motherboard 1415. The graphics card 1418 can reside in a slot (not shown), such as an AGP slot or a PCI slot, inside the computer housing 1412.

The arm 1404 is adapted for supporting at least two computer monitors 1420 and 1422, such as liquid crystal display (LCD) monitors. The first computer monitor 1420 includes a first light source 1424, such as a backlight, and a first inverter 1426 to provide power thereto. The first computer monitor 1420 has a first computer screen 1429 for displaying images. Likewise, the second computer monitor 1422 includes a second light source 1430, such as a backlight, and a second inverter 1432 to provide power thereto. The second computer monitor 1422 includes a second computer screen 1431 for displaying images.

The monitor controller assembly 1408 electronically controls the images displayed on the first screen 1429 of the first monitors 1420 and the second screen 1431 of the second monitor 1422. The monitor controller assembly 1408 transmits control signals, in the form of low voltage differential signaling (LVDS) for example, to electronically control the monitors 1420 and 1422. In addition, the monitor controller assembly 1408 supplies power and/or control signals to the inverters 1426 and 1432. For these purposes, a controller connector assembly 1433 is provided to allow the monitor controller assembly 1408 to be in electronic communication with the monitors 1420 and 1422. The controller connector assembly 1433 includes cables for sending LVDS, and for sending power to the screens 1429 and 1431, as well as cables for sending control signals and/or power to the inverters 1426 and 1432.

The graphics assembly 1410 sends signals to the monitor controller assembly 1408 to produce the images via electrical cables 1435. The graphics assembly 1410 is adapted for sending at least one of analog RGBhv/VGA signals and digital DVI signals to the monitor controller assembly 1408 to produce the images. Other appropriate signals, known to those of ordinary skill, may also be used.

Advantageously, by disposing the monitor controller assembly 1408 in the computer tower 1412, instead of in the monitors 1420 and 1422, the monitors are lighter and slimmer.

Figure 5:
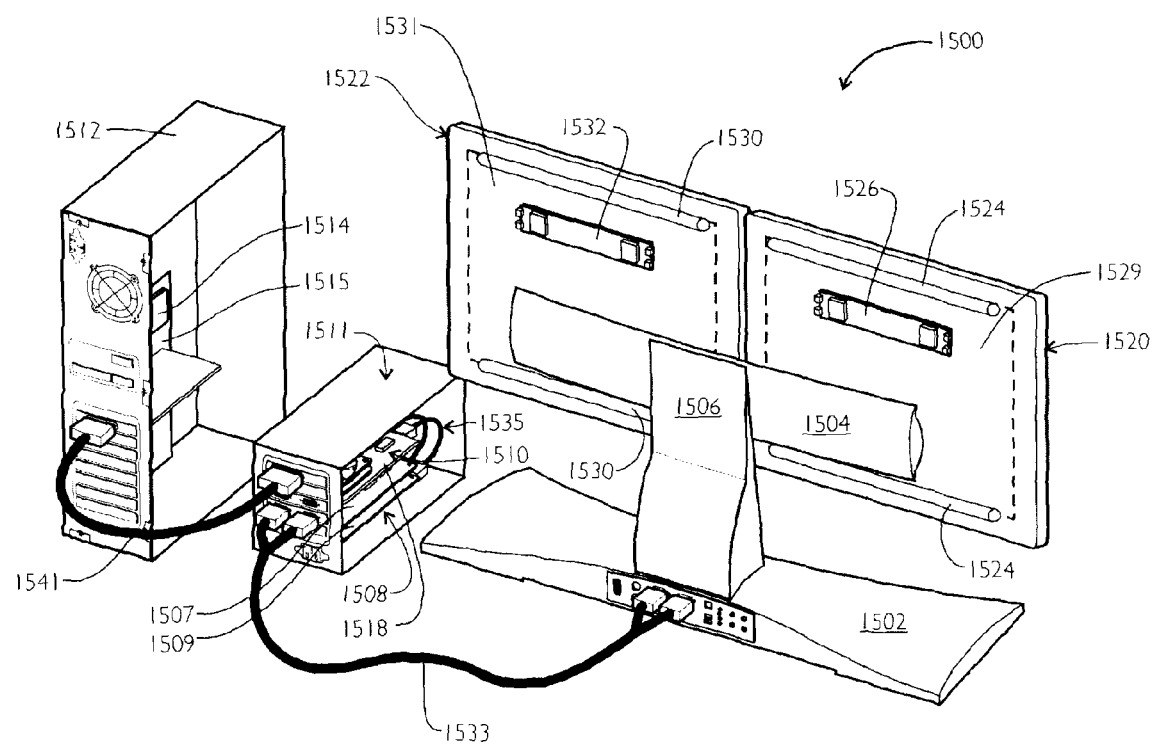
FIG. 5 is a rear view of yet another embodiment of a multi-monitor display system.

FIG. 5 shows another embodiment of a multi-monitor display system 1500. The system 1500 includes a base 1502 and an arm 1504. A column 1506 connects the base 1502 to the arm 1504. The system 1500 also includes a monitor controller assembly 1508, which includes two monitor controller cards 1507 and 1509, and a graphics assembly 1510. The monitor controller assembly 1508 and the graphics assembly 1510 are disposed in a graphics/controller module 1511. A computer housing 1512, such as a computer tower, includes at least one central processor 1514 disposed on a motherboard 1515. The graphics assembly 1510 includes a graphics card 1518. The central processor 1514 is in communication with the graphics assembly 1510 via a processor connector assembly 1541, such as the processor connector assembly 1336 shown in FIG. 2.

The arm 1504 is adapted for supporting at least two computer monitors 1520 and 1522, such as liquid crystal display (LCD) monitors. The first computer monitor 1520 includes a first light source 1524, such as a backlight, and a first inverter 1526 to provide power thereto. The first computer monitor 1520 has a first computer screen 1529 for displaying images. Likewise, the second computer monitor 1522 includes a second light source 1530, such as a backlight, and a second inverter 1532 to provide power thereto. The second computer monitor 1522 includes a second computer screen 1531 for displaying images.

The monitor controller assembly 1508 electronically controls the images displayed on the first screen 1529 of the first monitors 1520 and the second screen 1531 of the second monitor 1522. The monitor controller assembly 1508 transmits control signals, in the form of low voltage differential signaling (LVDS) for example, to electronically control the monitors 1520 and 1522. The monitor controller assembly 1508 also supplies power to the screens 1529 and 1521. In addition, the monitor controller assembly 1508 supplies power and/or control signals to the inverters 1526 and 1532. For these purposes, a controller connector assembly 1533 is provided, which includes electrical cables to allow the monitor controller assembly 1508 to be in electronic communication with the monitors 1520 and 1522.

The graphics assembly 1510 sends signals to the monitor controller assembly 1508 to produce the images via electrical connectors 1535. The graphics assembly 1510 is adapted for sending at least one of analog RGBhv/VGA signals and digital DVI signals, or any other appropriate video signals, to the monitor controller assembly 1508 to produce the images.

The graphics/controller module 1511 can include a housing having appropriate ports for the processor connector assembly 1541 and the controller connector assembly 1533. The graphics/controller module 1511 can include a cover or lid (the lid is shown removed in FIG. 5 to show contents) that is removable to access the monitor controller assembly 1508 and the graphics assembly 1510. If necessary, a separate power cord can be supplied to the module 1511.

The inventor contemplates that the graphics and controller assemblies can reside in various locations. Specifically, if B, C, A, M, H and G denote the base, the column, the arm, the monitors, the computer housing and the graphics/controller module, respectively, then the following embodiments are possible: {BB}, {BC}, {BA}, {BM}, {BH}, {BG}, {CB}, {CC}, {CA}, {CM}, {CH}, {CG}, {AB}, {AC}, {AA}, {AM}, {AH}, {AG}, {MB},{MC},{MA},{MM}, {MH}, {MG}, {HB},{HC},{HA},{HM}, {HH}, {HG}, {GB}, {GC}, {GA}, {GM}, {GH} and {GG}, where the first position indicates the location of the graphics assembly, and the second position indicates the location of the monitor controller assembly. For example, {HC} signifies the embodiment in which the graphics assembly is located in the computer housing and the monitor controller assembly is located in the column. It should be understood that in the embodiments containing "M," the assembly is located in one or more monitors. Thus, {MB} signifies the embodiment in which the monitor controller assembly is in the base, and the graphics assembly is in one or more of the monitors.

It is also contemplated that the assemblies can be spread out over more than one component. For example, a first part of the graphics assembly can be located in the base, and a second part can be located in the column.

While embodiments of this invention have been illustrated in the accompanying drawings and described above, it will be evident to those skilled in the art that changes and modifications may be made therein without departing from the essence of this invention. For example, although FIGS. 1, 3, 4 and 5 show two monitors, it should be understood that this is only in the interest of clarity. In particular, the principles of the present invention can also be applied to an N-screen display system, where N is greater than two, such as a three-screen display system, or a four-screen display system, mutatis mutandis. Thus, in a three-screen display system, a triple-port graphics card, three single-port graphics card, or a single port graphics card and a two-port graphics card can be used. In addition, three controller cards would be used in a triple-screen display system.

Also, while reference has been made throughout to LCD screens, it will be appreciated that the support system disclosed herein is equally well suited to be used with virtually any type of flat panel-type display screen, or other form of display screen, such as DLP, plasma and OLED display screens/monitors.

In addition, the inventor contemplates embodiments, consistent with the present invention, in which there is no base. For example, in a floor, wall or ceiling mounted display system, a column may be directly connected to a floor, wall or ceiling to support the arm. Thus, a column that is directly connected to a floor, wall or ceiling can make an angle therewith that varies from zero degrees (i.e., vertically displaced, extending upwards, as might be applicable when the column is connected to a floor) to 180 degrees (i.e., vertically displaced, extending downwards, as might be applicable when the column is connected to a ceiling). The monitor controller assembly and/or the graphics assembly can be located in the floor, wall or ceiling.

Moreover, the principles of the present invention also apply to a single-monitor display system having a support structure for supporting one monitor. In such case, the monitor controller assembly and/or the graphics assembly can be disposed in various locations throughout the support structure, in the single monitor, in the computer housing and/or in a graphics/controller module.

While the invention has been described in the specification and illustrated in the drawings with reference to various preferred embodiments, it will be understood by those skilled in the art that various changes may be made and equivalents may be substituted for elements thereof without departing from the scope of the invention as defined in the claims.

What is claimed is:

1. A monitor display system for use with a motherboard disposed within a computer housing, the system comprising:
    a base;
    a column connected to the base for supporting a monitor having a display screen and a monitor chassis;
    a cover on the column;
    a monitor controller assembly for electronically controlling images displayed on the screen, wherein the monitor controller assembly transmits timing signals and power to the monitor for electronically controlling the images, the timing signals transmitted using low voltage differential signaling;
    a graphics assembly for receiving signals from the motherboard and for sending signals to the monitor controller assembly to produce the images; and
    an external electrical cable to allow electrical communication between the motherboard and the graphics assembly, wherein a) the graphics assembly is disposed outside of the monitor chassis, and b) the graphics assembly and the monitor controller assembly are disposed inside the column and accessible by moving the cover.

2. The system of claim 1, further comprising the monitor and wherein the monitor is one of a liquid crystal display, DLP, plasma and OLED monitor.

3. The system of claim 2, wherein the monitor includes a light source, and an inverter to supply voltage thereto.

4. The system of claim 3, wherein the monitor controller assembly transmits power and control signals to the inverter.

5. The system of claim 4, wherein the a graphics assembly is adapted for sending at least one of analog RGBhv/VGA signals and digital DVI signals to the monitor controller assembly to produce the images.

\* \* \* \* \*